(12) United States Patent
Sammut

(10) Patent No.: US 9,955,624 B2
(45) Date of Patent: May 1, 2018

(54) WIDE AREA TURF MOWER

(71) Applicant: Sammut Agricultural Machinery Pty Ltd., Freemans Reach NSW (AU)

(72) Inventor: Daniel Sammut, Freemans Reach (AU)

(73) Assignee: SAMMUT AGRICULTURAL MACHINERY PTY LTD., Freemans Reach NSW (AU)

(*) Notice: Subject to any disclaimer, the term of this patent is extended or adjusted under 35 U.S.C. 154(b) by 0 days. days.

(21) Appl. No.: 14/978,149

(22) Filed: Dec. 22, 2015

(65) Prior Publication Data

US 2017/0172054 A1 Jun. 22, 2017

(51) Int. Cl.
| | | |
|---|---|---|
| A01B 73/02 | (2006.01) | |
| A01B 73/06 | (2006.01) | |
| A01D 75/30 | (2006.01) | |
| A01D 34/44 | (2006.01) | |
| A01B 73/04 | (2006.01) | |
| A01B 63/32 | (2006.01) | |
| A01D 101/00 | (2006.01) | |

(52) U.S. Cl.
CPC .......... *A01B 73/067* (2013.01); *A01B 63/32* (2013.01); *A01B 73/02* (2013.01); *A01B 73/044* (2013.01); *A01D 34/44* (2013.01); *A01D 75/30* (2013.01); *A01D 75/303* (2013.01); *A01D 75/306* (2013.01); *A01D 2101/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,616,626 A | * | 11/1971 | Bramley et al. ........ | A01D 34/44 56/10.7 |
| 4,409,780 A | * | 10/1983 | Beougher .............. | A01B 73/02 172/456 |
| 4,418,762 A | * | 12/1983 | Page ...................... | A01B 73/02 172/311 |
| 4,896,732 A | * | 1/1990 | Stark ...................... | A01B 73/02 172/311 |
| 7,861,795 B2 | * | 1/2011 | Dillon ................... | A01B 73/02 172/311 |

FOREIGN PATENT DOCUMENTS

DE 3628605 A1 * 2/1988 ............ A01B 71/06

* cited by examiner

*Primary Examiner* — Alicia Torres
(74) *Attorney, Agent, or Firm* — Abelman, Frayne & Schwab

(57) ABSTRACT

A wide area turf mower has a wheel supported main frame and cutting units movably connected to the main frame and positioned in rows in a staggered order to form a mower cutting configuration for cutting a continuous swath of turf between any two outer cutting units located respectively on opposite sides of the main frame. One row of the cutting units includes a first pair of pivotally interconnected outer and inner cutting units at a first side of the main frame, and a second pair of pivotally interconnected inner and outer cutting units at the second side of the main frame. First hydraulic cylinders cause the outer cutting units to fold in a direction towards the rear end of the main frame. Second hydraulic cylinders cause the inner cutting units to lift in an upward direction. A controller operates all of the hydraulic cylinders.

20 Claims, 17 Drawing Sheets

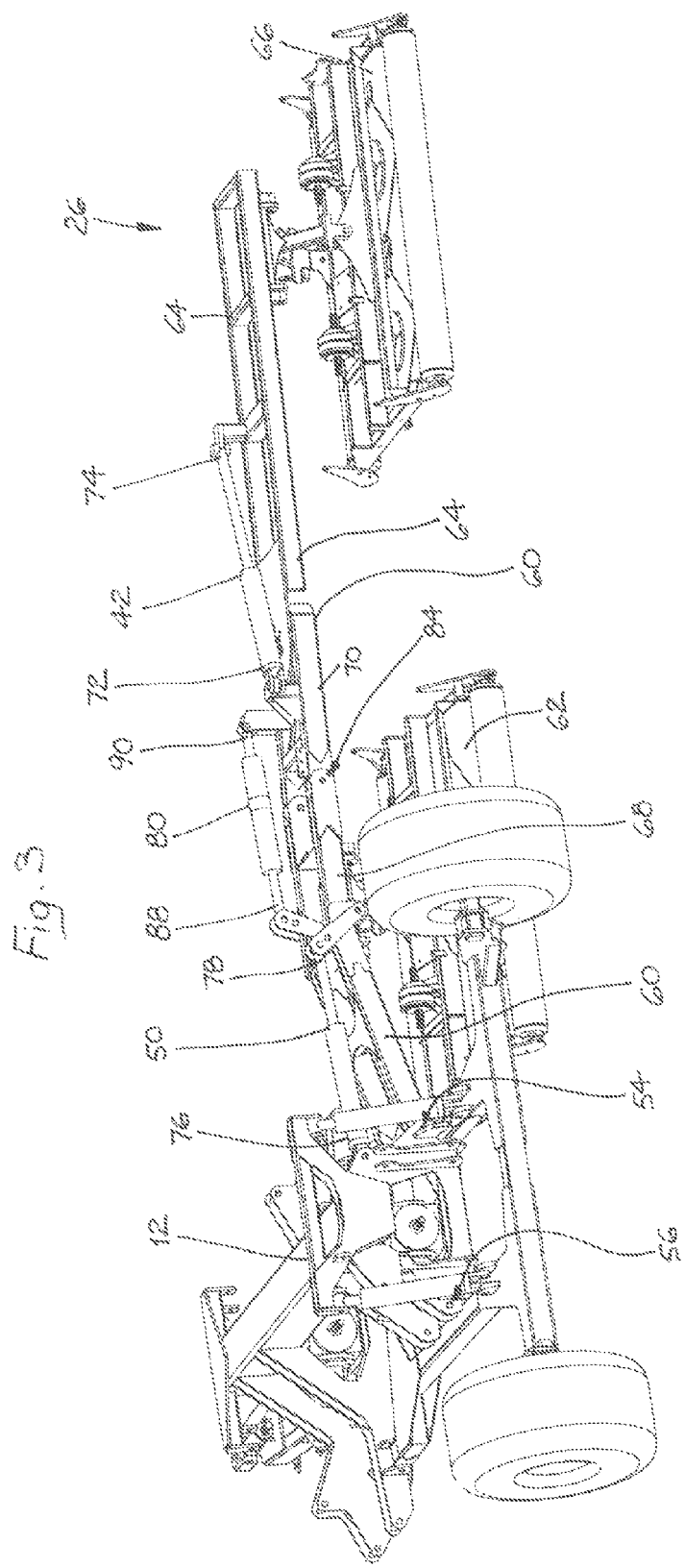

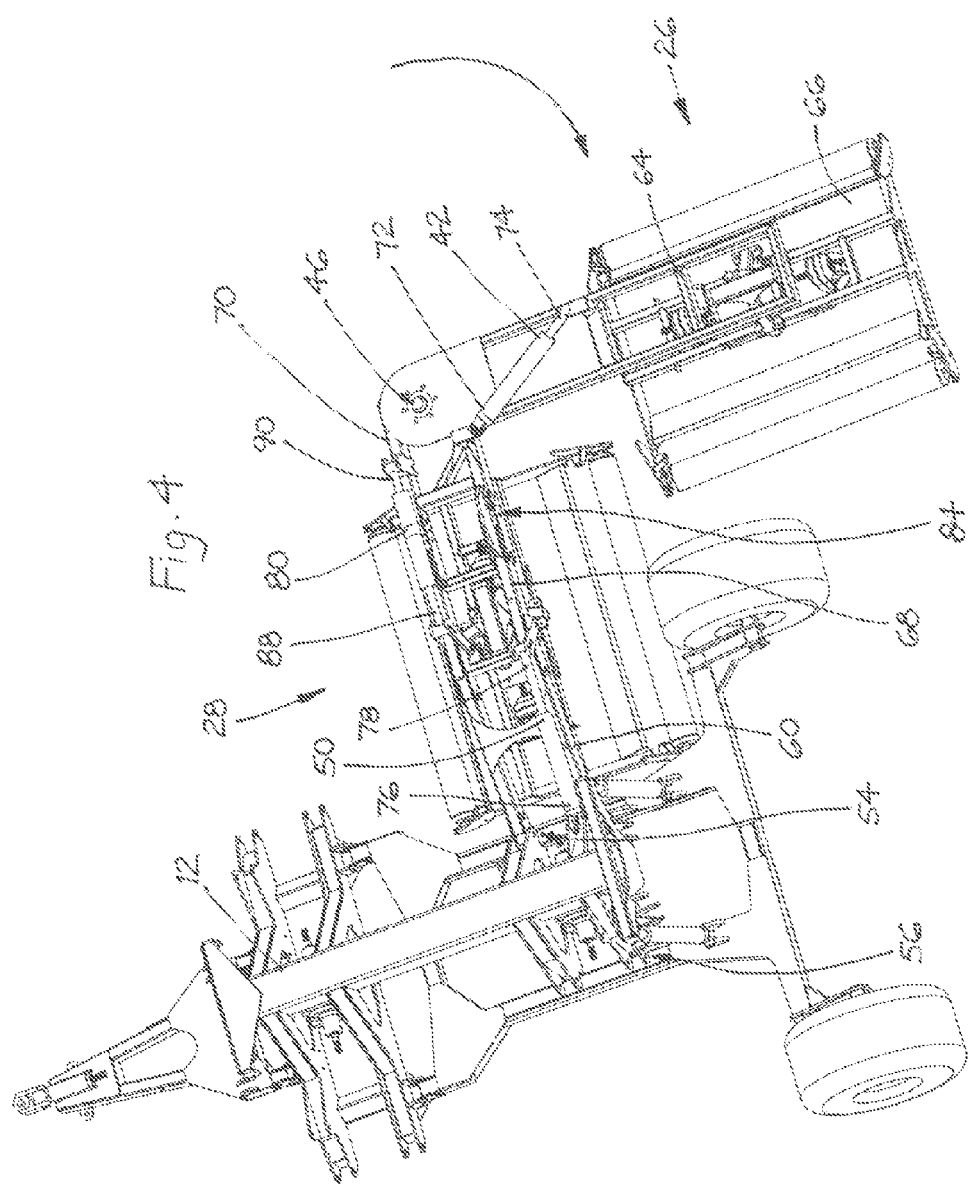

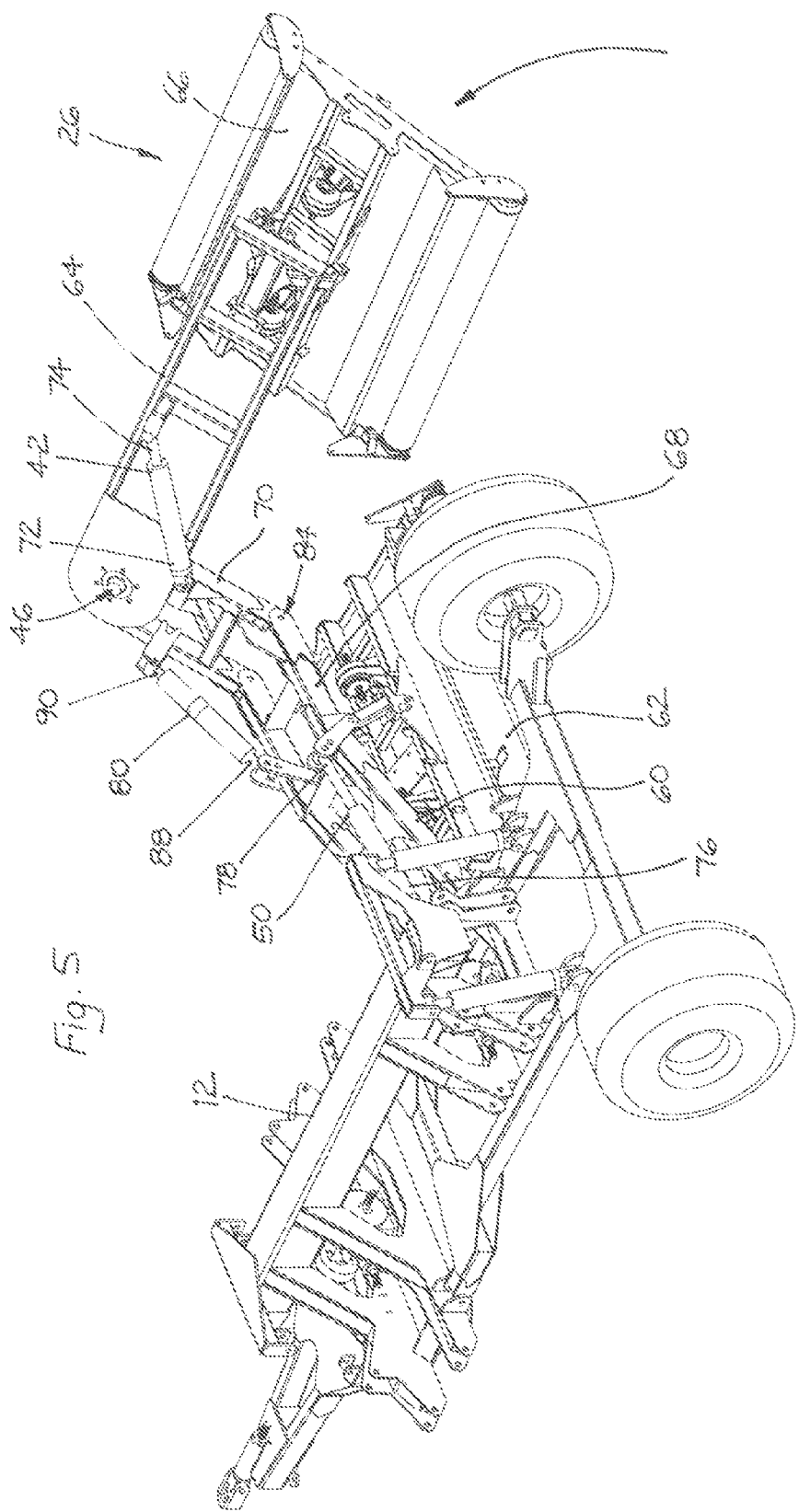

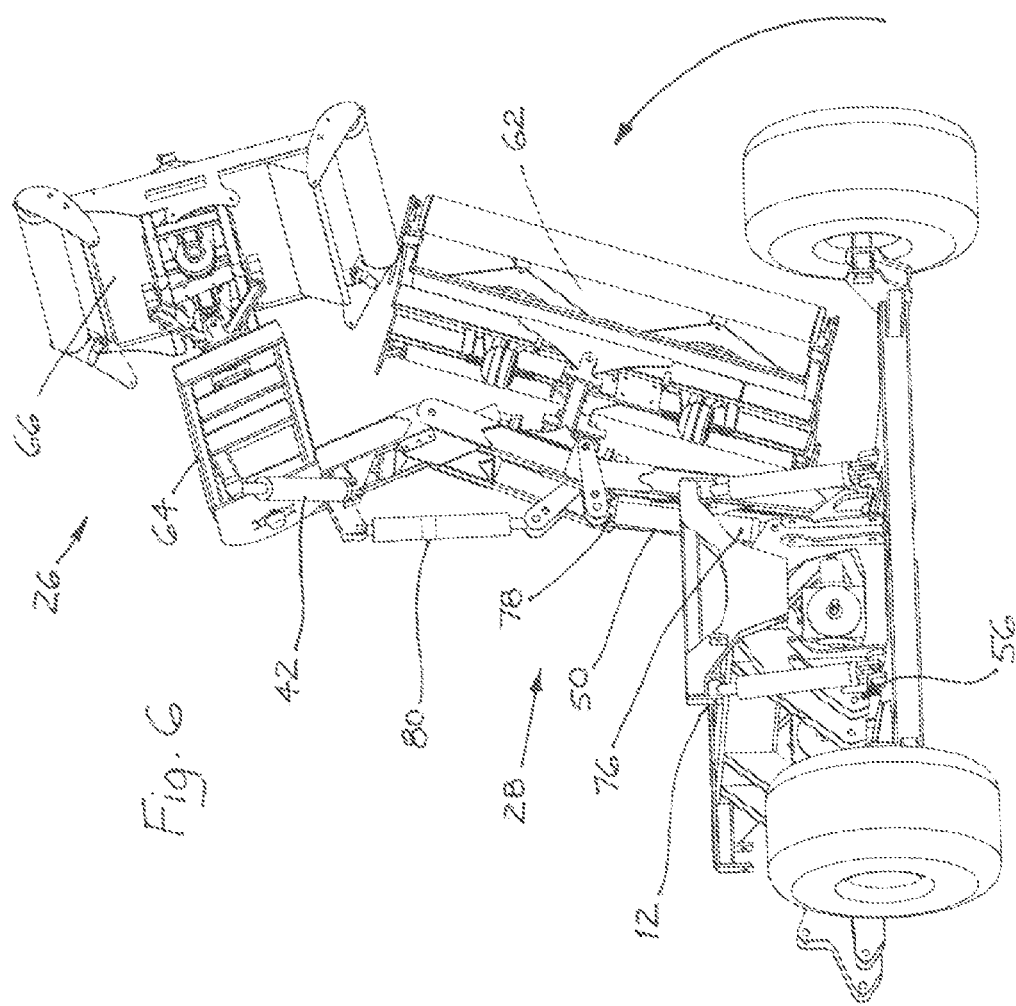

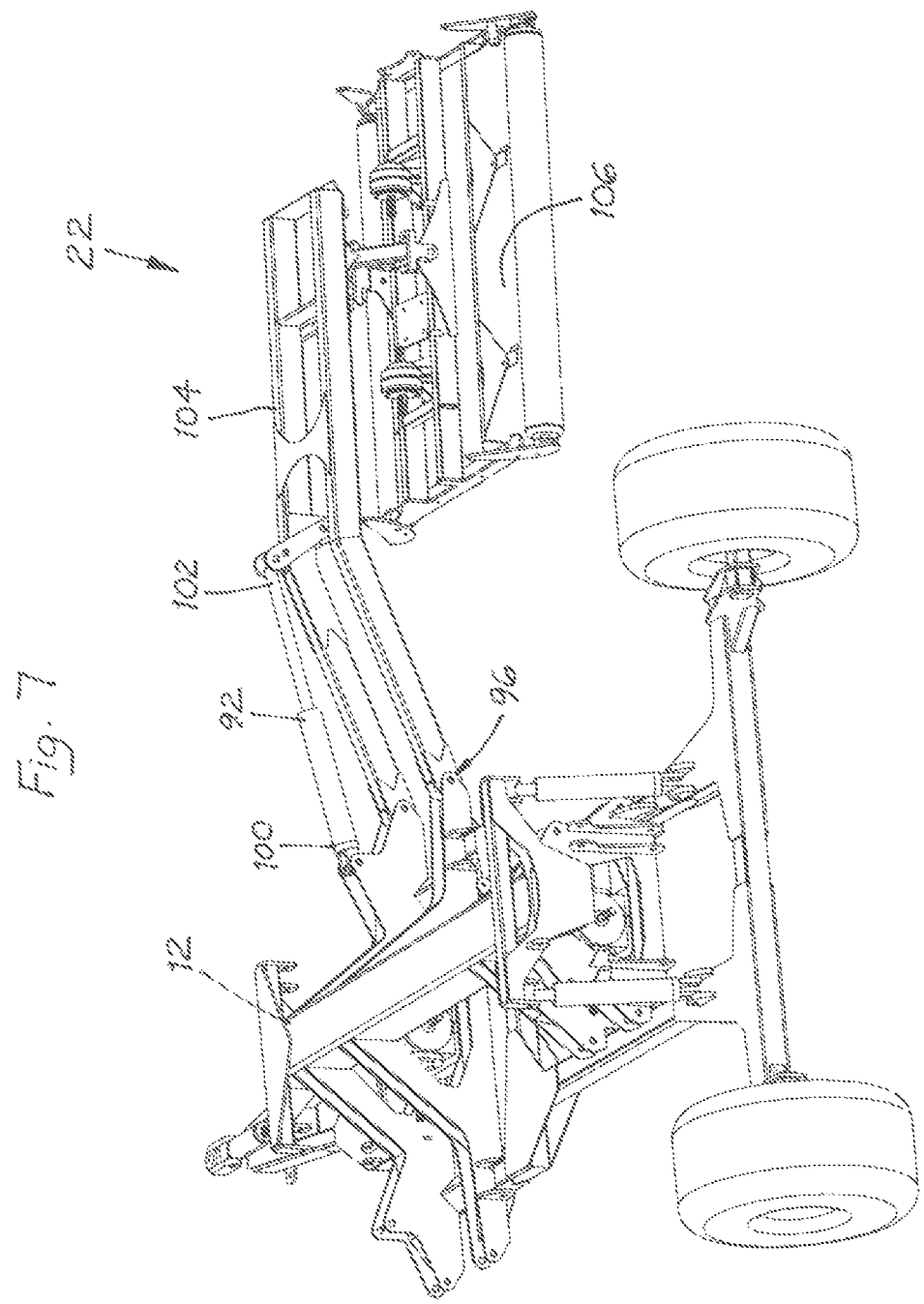

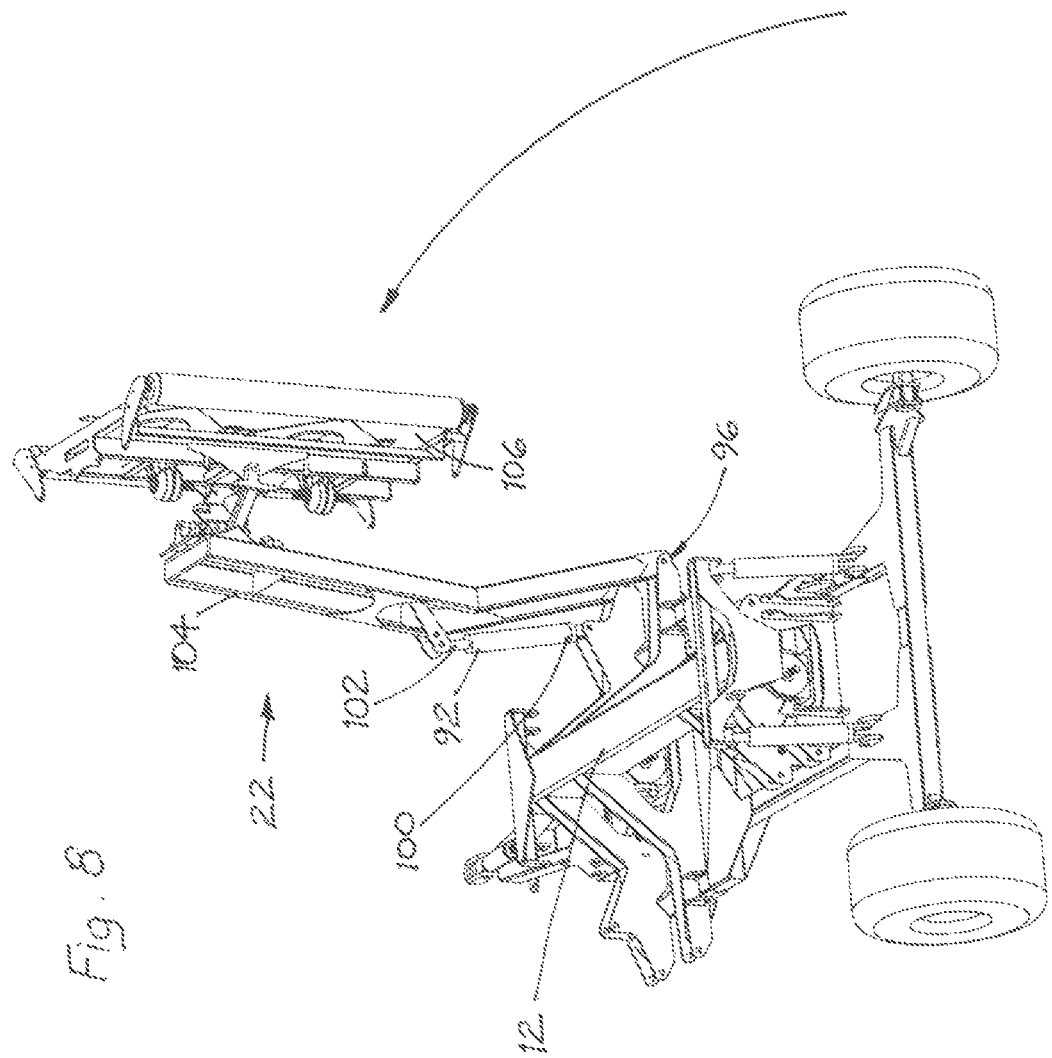

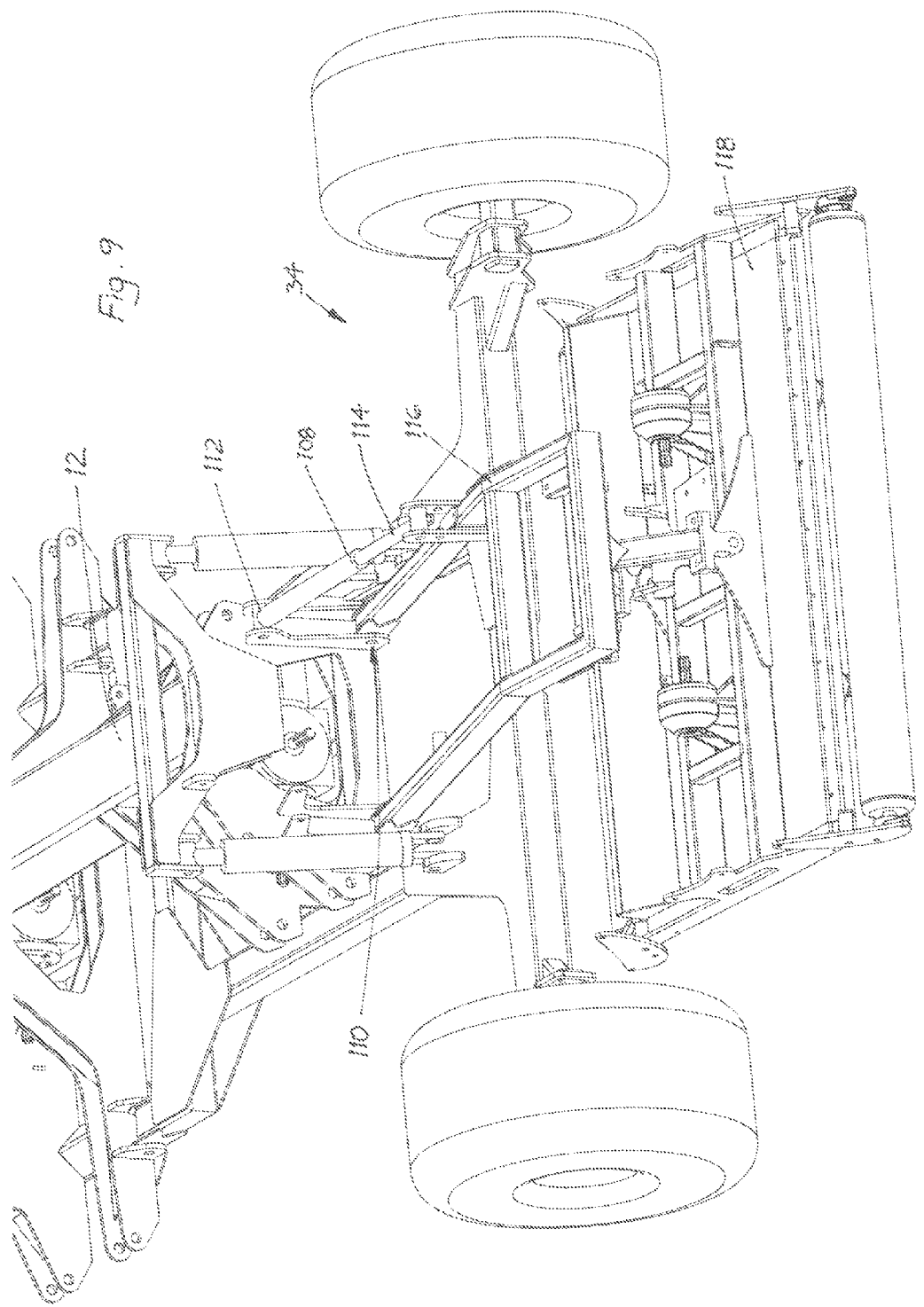

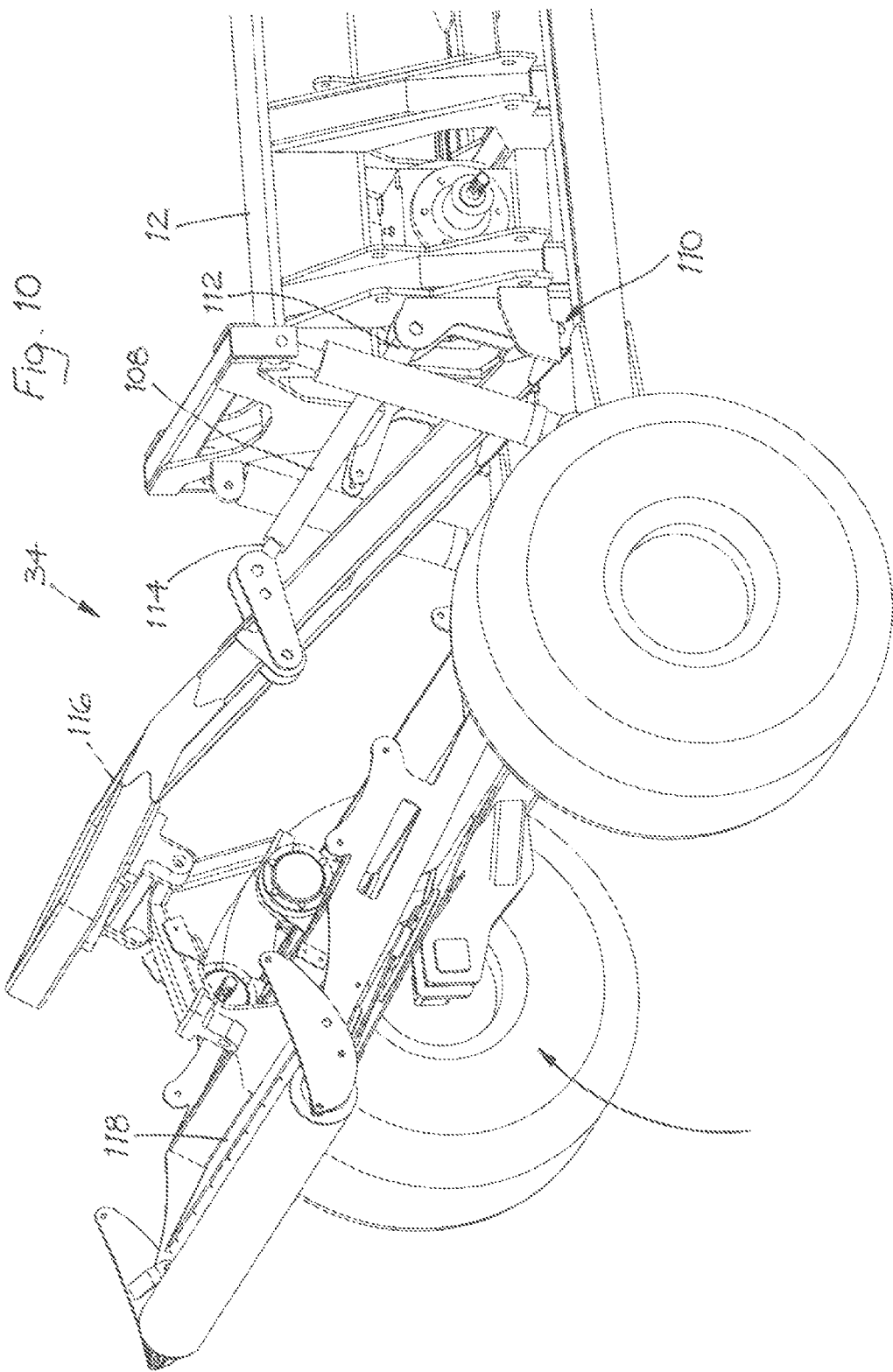

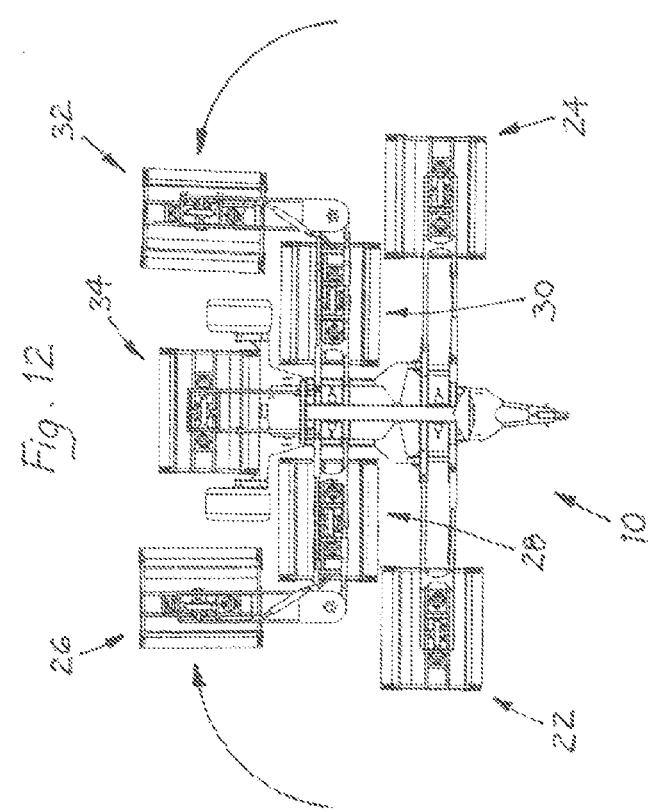
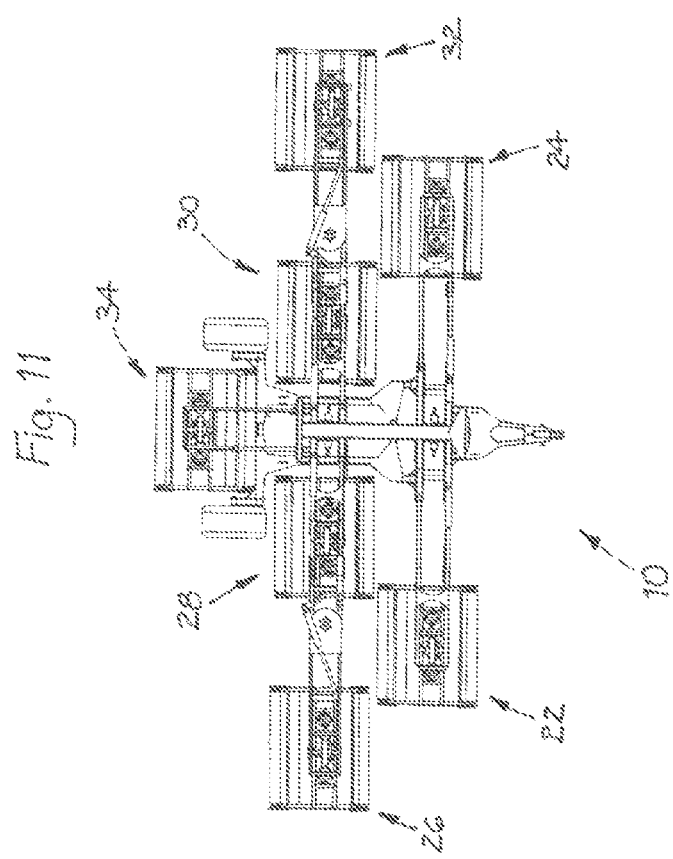

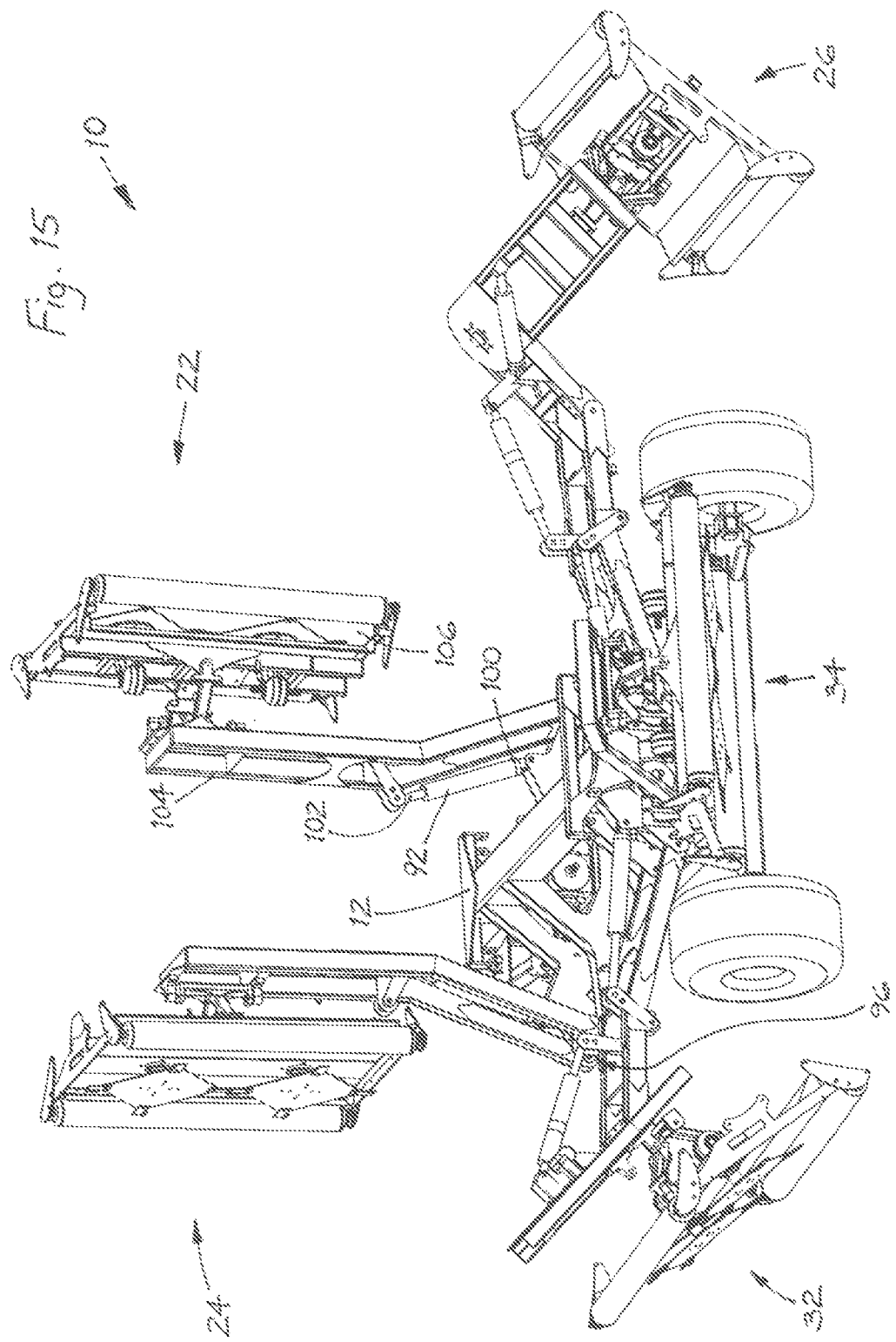

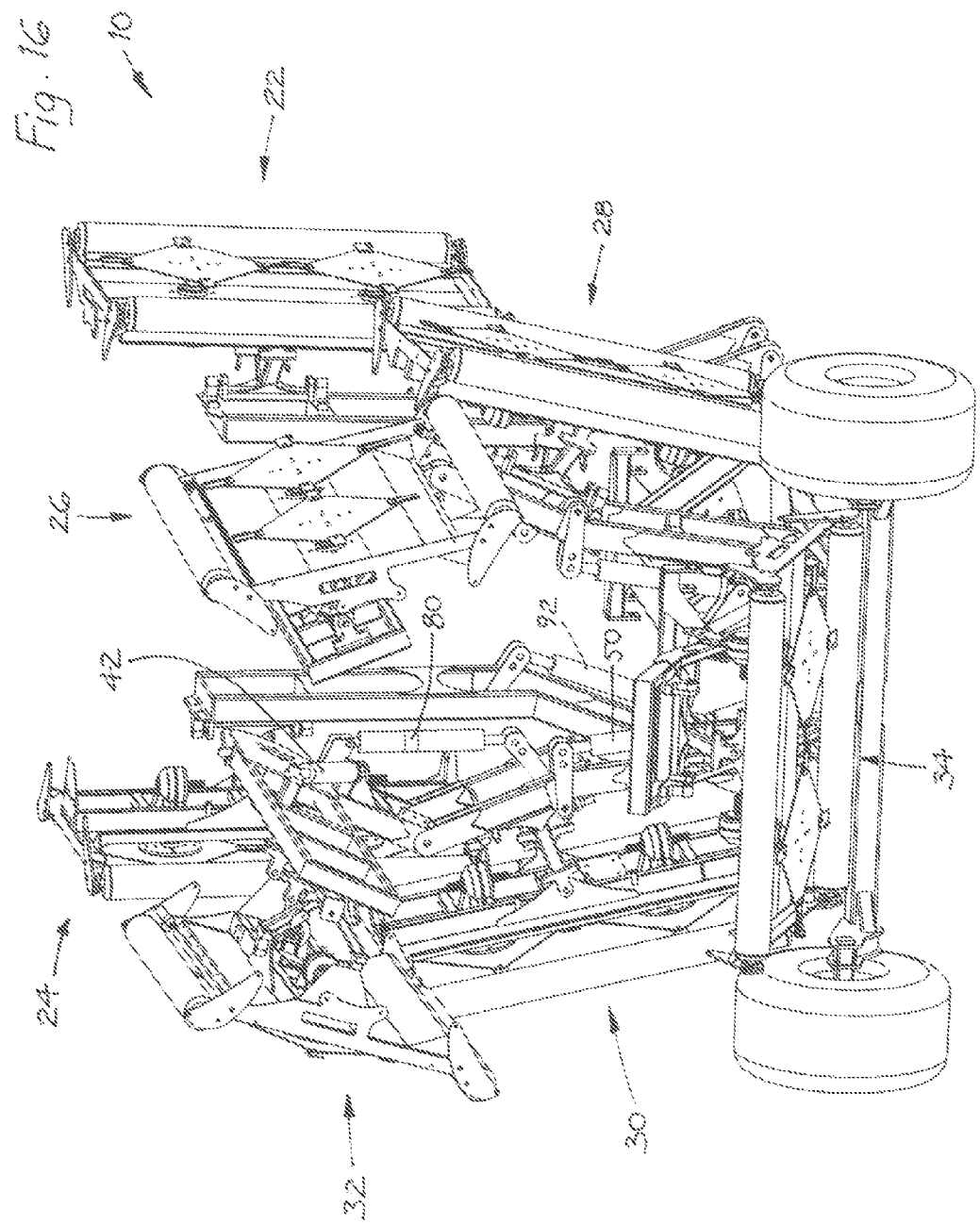

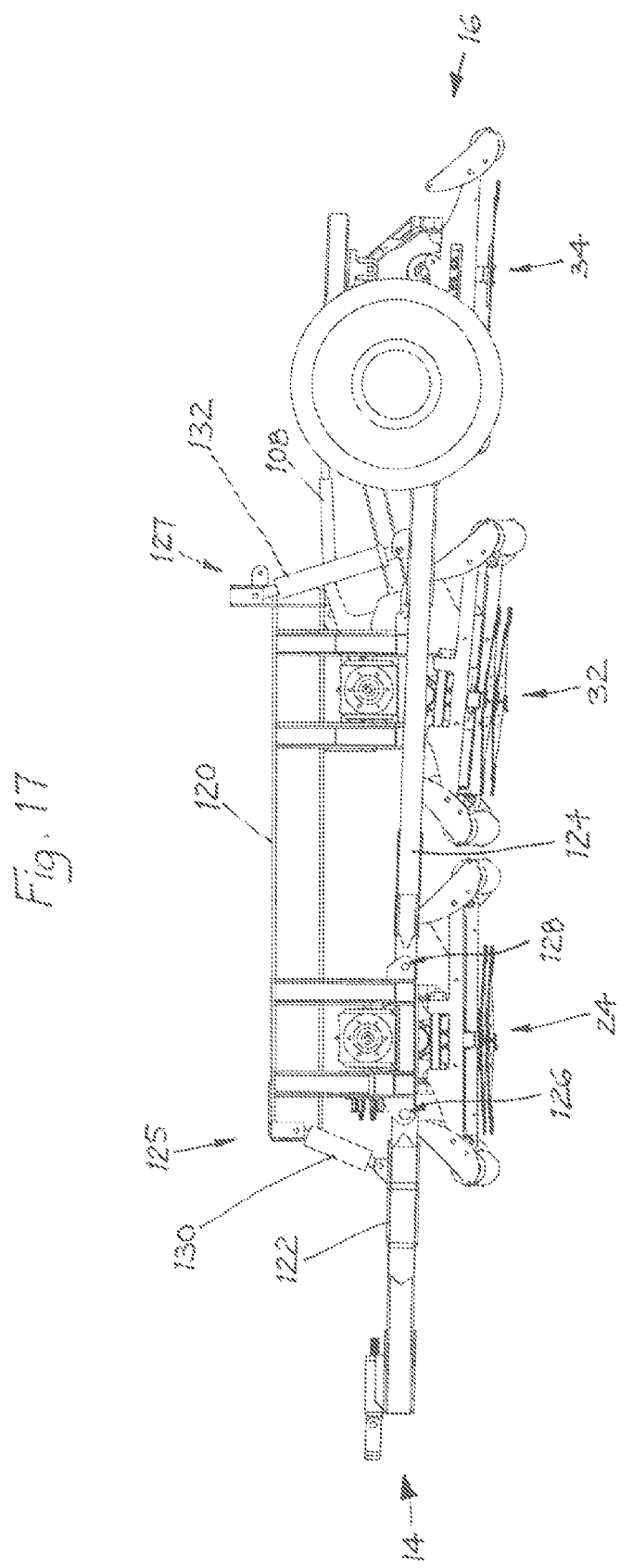

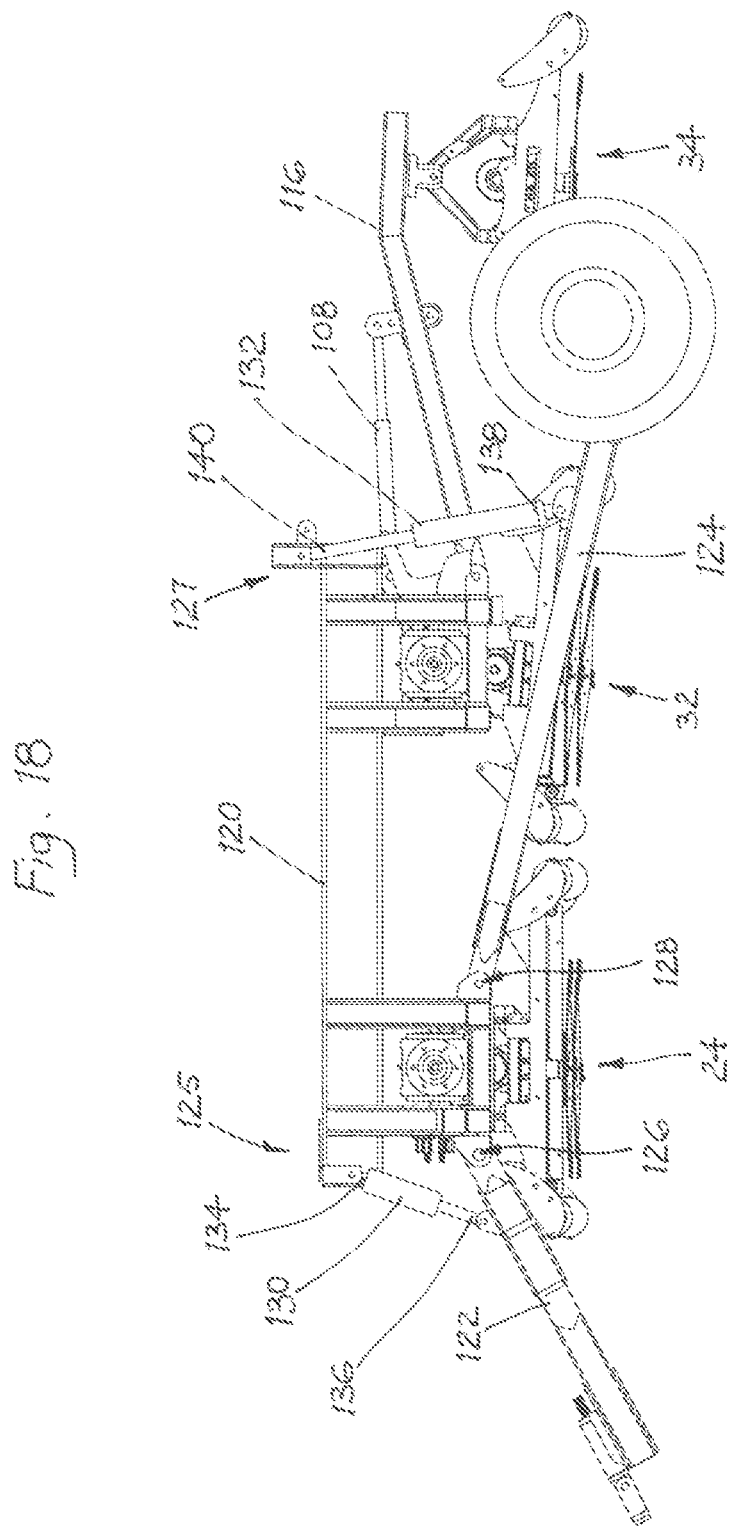

WIDE AREA TURF MOWER

FIELD OF INVENTION

The present invention relates to a turf mower of the gang-type that may be pulled by a tractor and, more particularly, to a wide area turf mower having an articulated arrangement of cutting units positioned in rows behind the tractor in a staggered order to form a mower cutting configuration for cutting a continuous swath of turf between any two outermost cutting units, and in which each cutting unit can be raised from its cutting position to a position which enables the mower to assume a width and height suitable for road use.

BACKGROUND ART

Gang-type, wide area turf mowers are known but their width is largely limited by their ability, after use, to assume a width and height suitable for road use, where the mowers are being driven on roads before or after cutting turf.

To optimise width for cutting, but at the same time maintain a staggered configuration of cutting units to ensure that a continuous swath of turf is being cut, and to enable, after cutting, the necessary lifting and folding movements required for road use, each of the cutting units of these prior art turf mowers is of a relatively large width. The greater the width of a cutting unit, the less likely it is to follow closely the contour of the ground upon which grows the turf it is cutting.

SUMMARY OF THE INVENTION

It is, therefore, an object of the present invention to provide a wide area turf mower of the gang-type suitable for use with a tractor, and which has a plurality of cutting units, so arranged and interconnected around a main frame that they can be lifted and folded to allow the mower to assume a width and height suitable for road use, and so dimensioned that they will more closely follow the contour of the ground upon which grows the turf being cut than prior art wide area turf mowers.

According to the present invention there is provided a wide area turf mower comprising;
- (a) a wheel supported main frame having a front end, a rear end and opposite first and second sides,
- (b) a plurality of cutting units movably connected to the main frame and positioned in rows in a staggered order to form a mower cutting configuration for cutting a continuous swath of turf between any two outer cutting units located respectively on the opposite sides of the main frame,
- (c) one row of the cutting units comprising a first pair of interconnected outer and inner cutting units at the first side of the main frame and a second pair of interconnected inner and outer cutting units at the second side of the main frame, each of the inner cutting units being pivotally connected to the main frame, each of the outer cutting units being pivotally connected to a respective inner cutting unit,
- (d) a first hydraulic means for rotating each of the outer cutting units relative to its respective inner cutting unit about a respective vertical pivot axis, whereby each of the outer cutting units fold in a direction towards the rear end of the main frame,
- (e) a second hydraulic means for rotating each of the inner cutting units relative to the main frame about a respective horizontal pivot axis, whereby each of the inner cutting units lift in an upward direction, and
- (f) a control means for operating the first hydraulic means and the second hydraulic means.

Preferably, the control means operates the first hydraulic means before operating the second hydraulic means.

Each inner cutting unit preferably comprises an inner pivot frame and an inner mower deck connected to the underside of the inner pivot frame, an inner end of the inner pivot frame being pivotally connected to the main frame and an outer end of the inner pivot frame being pivotally connected to its respective outer cutting unit.

It is preferred that each outer cutting unit comprises an outer pivot frame member and an outer mower deck connected to the underside of the outer pivot frame member, an inner end of the outer pivot frame member being pivotally connected to the outer end of its respective inner pivot frame.

Preferably, the inner pivot frame comprises pivotally interconnected first and second pivot frame members, and the inner mower deck is connected to the underside of the first pivot frame member, an inner end of the first pivot frame member being pivotally connected to a respective side of the main frame.

In a preferred form, the first hydraulic means has a first end pivotally connected to the second pivot frame member and a second end pivotally connected to the outer pivot frame member.

In another preferred form, the second hydraulic means has a first end pivotally connected to the main frame and a second end pivotally connected to the first pivot frame member.

Preferably, the turf mower further comprises a third hydraulic means for rotating each of the outer cutting units relative to its respective inner cutting unit about a respective horizontal pivot axis, whereby each of the outer cutting units lift in an upward direction.

In another preferred form, the third hydraulic means has a first end pivotally connected to the first pivot frame member and a second end pivotally connected to the second pivot frame member.

Preferably, the control means operates the first hydraulic means before operating the third hydraulic means before operating the second hydraulic means.

The turf mower further comprises another row of the cutting units at the front end of the main frame, the another row comprising a front cutting unit at the first side of the main frame and a front cutting unit at the second side of the main frame, each of the front cutting units being pivotally connected to the main frame, and front hydraulic means for rotating each of the front cutting units relative to the main frame about a respective front horizontal pivot axis, whereby each of the front cutting units lift in an upward direction, and wherein the control means operates the front hydraulic means after operating the first hydraulic means.

Each front cutting unit preferably comprises a front pivot frame member and a front mower deck connected to the underside of the front pivot frame member, an inner end of the front pivot frame member being pivotally connected to a respective side of the main frame.

The turf mower further comprises yet another row of the cutting units at the rear end of the main frame, the yet another row comprising a rear cutting unit pivotally connected to the main frame, and rear hydraulic means for rotating the rear cutting unit relative to the main frame about a rear horizontal pivot axis, whereby the rear cutting unit lifts in an upward direction, and wherein the control means operates the rear hydraulic means after operating the first hydraulic means.

The rear cutting unit preferably comprises a rear pivot frame member and a rear mower deck connected to the underside of the rear pivot frame member, an inner end of the rear pivot frame member being pivotally connected to the rear end of the main frame.

The mower cutting configuration formed by the above described articulated arrangement of cutting units positioned in rows in a staggered order is a generally w-shaped configuration.

In the most preferred form, the control means operates the first hydraulic means before operating the third hydraulic means before operating the rear hydraulic means before operating the front hydraulic means before operating the second hydraulic means.

Preferably, the main frame comprises a main body, a forward tow sub-chassis and a rearward wheel sub-chassis, the main body being pivotally connected at its front end to a rearward end of the forward tow sub-chassis, and being pivotally connected rearwardly of its front end to a forward end of the rearward wheel sub-chassis.

The turf mower preferably further comprises forward hydraulic means for lifting the front end of the main body relative to a ground surface and rearward hydraulic means for lifting a rear end of the main body relative to the ground surface, and wherein the control means operates the forward and rearward hydraulic means simultaneously to raise the main frame vertically whilst maintaining the main body generally parallel to the ground surface.

In a preferred form, the forward hydraulic means has a first end pivotally connected to the front end to the main body and a second end pivotally connected to the forward tow sub-chassis.

In another preferred form, the rearward hydraulic means has a first end pivotally connected to the rearward wheel sub-chassis and a second end pivotally connected to the rear end of the main body.

It is preferred that each hydraulic means comprises a hydraulic cylinder.

With the above described linkage arrangement of the main body, forward tow sub-chassis, rearward wheel sub-chassis, forward and rearward hydraulic means, and control means, each of the cutting units positioned in rows in the staggered order which form the mower cutting configurations described earlier can be lifted simultaneously from a cutting position to a transit position above the ground surface when the main frame is raised vertically.

SUMMARY OF THE DRAWINGS

In order that the invention may be more readily understood and put into practical effect, reference will now be made to the accompanying drawings.

FIG. 3 is a rear perspective view of a deconstructed form of the wide area turf mower of FIGS. 1 and 2 in which, for ease of description of the folding and lifting operation on each pair of the interconnected inner and outer cutting units, the drawing does not show both of the front cutting units, does not show the rear cutting unit, and does not show the first pair of interconnected inner and outer cutting units at the first side of the main frame, but does show the second pair of interconnected inner and outer cutting units at the second side of the main frame at a cutting position prior to the start of the folding and lifting operation thereon.

FIG. 4 is a rear perspective view of the wide area turf mower as shown in FIG. 3, but from a higher angle, and in which the outer cutting unit has been slightly lifted and then rotated relative to the inner cutting unit about a vertical pivot axis so that the outer cutting unit is relocated towards the rear end of the main frame.

FIG. 5 is a rear perspective view of the wide area turf mower as shown in FIG. 4 but in which the outer cutting unit has been rotated relative to the inner cutting unit about a first horizontal pivot axis so that the outer cutting unit is lifted in an upward direction.

FIG. 6 is a rear perspective view of the wide area turf mower as shown in FIG. 5 but in which the inner cutting unit has been rotated relative to the main frame about a second horizontal pivot axis so that the inner cutting unit is lifted in an upward direction, and the second pair of interconnected inner and outer cutting units are at a road use position.

FIG. 7 is a rear perspective view of another deconstructed form of the wide area turf mower of FIGS. 1 and 2 in which, for ease of description of the lifting operation on each of the front cutting units, the drawing does not show the rear cutting unit, does not show the first and second pairs of interconnected inner and outer cutting units at respective first and second sides of the main frame, and does not show the front cutting unit at the first side of the main frame, but does show the front cutting unit at the second side of the main frame at a cutting position prior to the start of the lifting operation thereon.

FIG. 8 is a rear perspective view of the wide area turf mower as shown in FIG. 7 but in which the front cutting unit has been rotated relative to the main frame about a front horizontal axis so that the front cutting unit is lifted in an upward direction, and the front cutting unit is at a road use position.

FIG. 9 is a rear perspective view of another deconstructed form of the wide area turf mower of FIGS. 1 and 2 in which, for ease of description of the lifting operation on the rear cutting unit, the drawing is enlarged to show only a rear portion of the turf mower, and does not show both of the front cutting units, and does not show the first and second pairs of interconnected inner and outer cutting units at respective first and second sides of the main frame, but does show the rear cutting unit at a cutting position prior to the start of the lifting operation thereon.

FIG. 10 is a rear perspective view of the rear portion of the wide area turf mower as shown in FIG. 9, but from a side angle, and in which the rear cutting unit has been rotated relative to the main frame about a rear horizontal axis so that the rear cutting unit is lifted in an upward direction, and the rear cutting unit is at a road use position.

FIG. 11 is a top view of the wide area turf mower of FIGS. 1 and 2 showing the mower cutting configuration formed by the cutting units positioned in rows in a staggered order prior to the start of the folding and lifting operation on all of the cutting units.

FIG. 12 is a top view of the wide area turf mower of FIG. 11 at a first stage of the operation when each of the outer cutting units have been slightly lifted and then rotated in a direction towards the rear end of the main frame, as also shown for one of the outer cutting units in FIG. 4.

FIG. 15 is a rear perspective view of the wide area turf mower of FIG. 14 at a fourth stage of the operation when each of the front cutting units have been lifted in an upward direction, as also shown for one of the front cutting units in FIG. 8.

FIG. 16 is a rear perspective view of the wide area turf mower of FIG. 15 at a fifth stage of the operation when each of the inner cutting units have been lifted in an upward direction, as also shown for one of the inner cutting units in FIG. 6.

FIG. 17 is a side view of a deconstructed form of the wide area turf mower of FIGS. 1 and 2 in which, for ease of description of the raising operation on the main frame, the drawing does not fully show both of the front cutting units, and does not fully show the first and second pairs of interconnected inner and outer cutting units at respective first and second sides of the main frame, but does show the rear cutting unit at a cutting position.

FIG. 18 is a side view of the wide area turf mower of FIG. 17 but in which the main frame has been raised vertically so that the rear cutting unit is at a transit position above the ground surface.

DETAILED DESCRIPTION OF THE INVENTION

Figure 1:
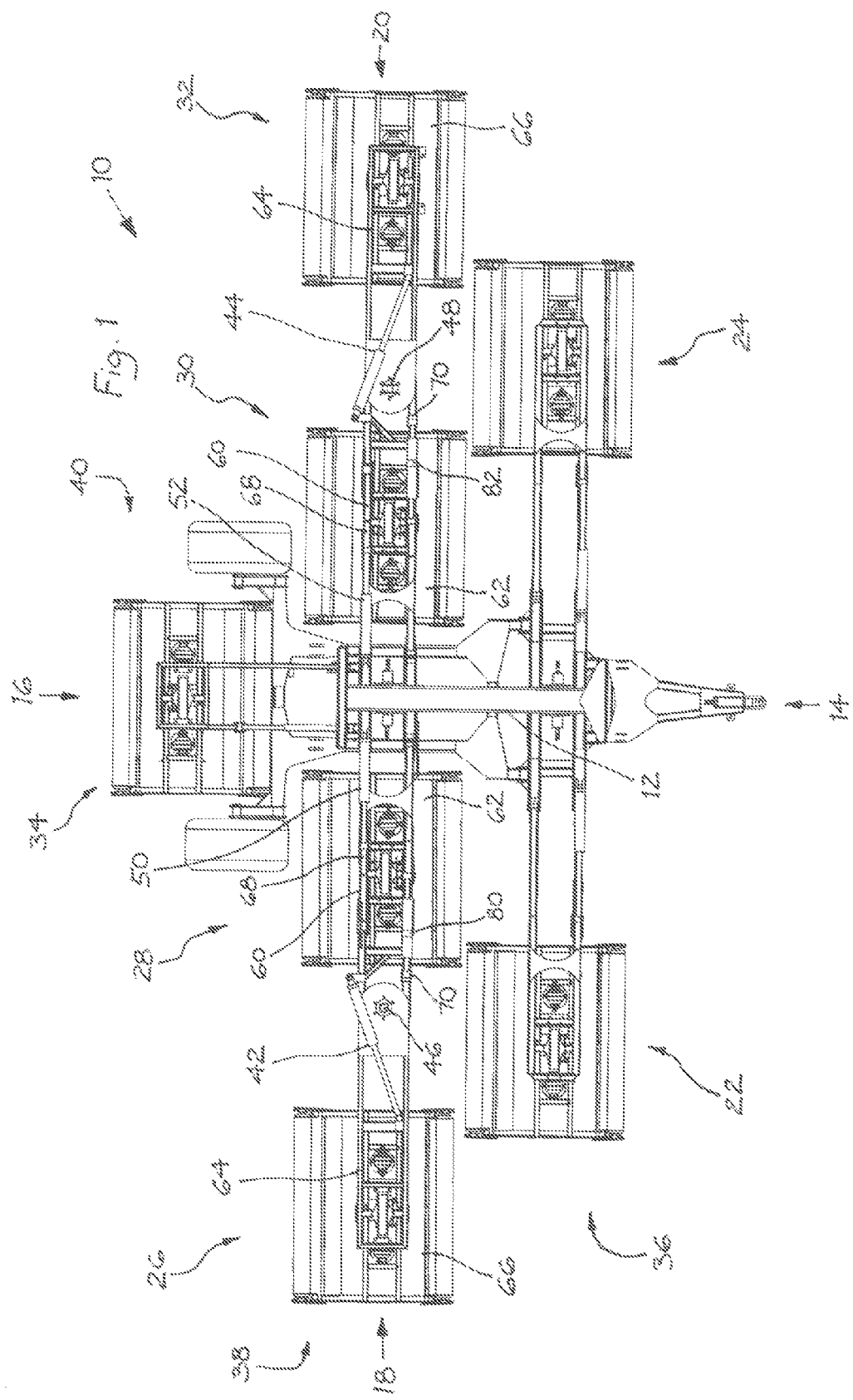
FIG. 1 is a top view of a wide area turf mower according to one embodiment of the present invention.
Figure 2:
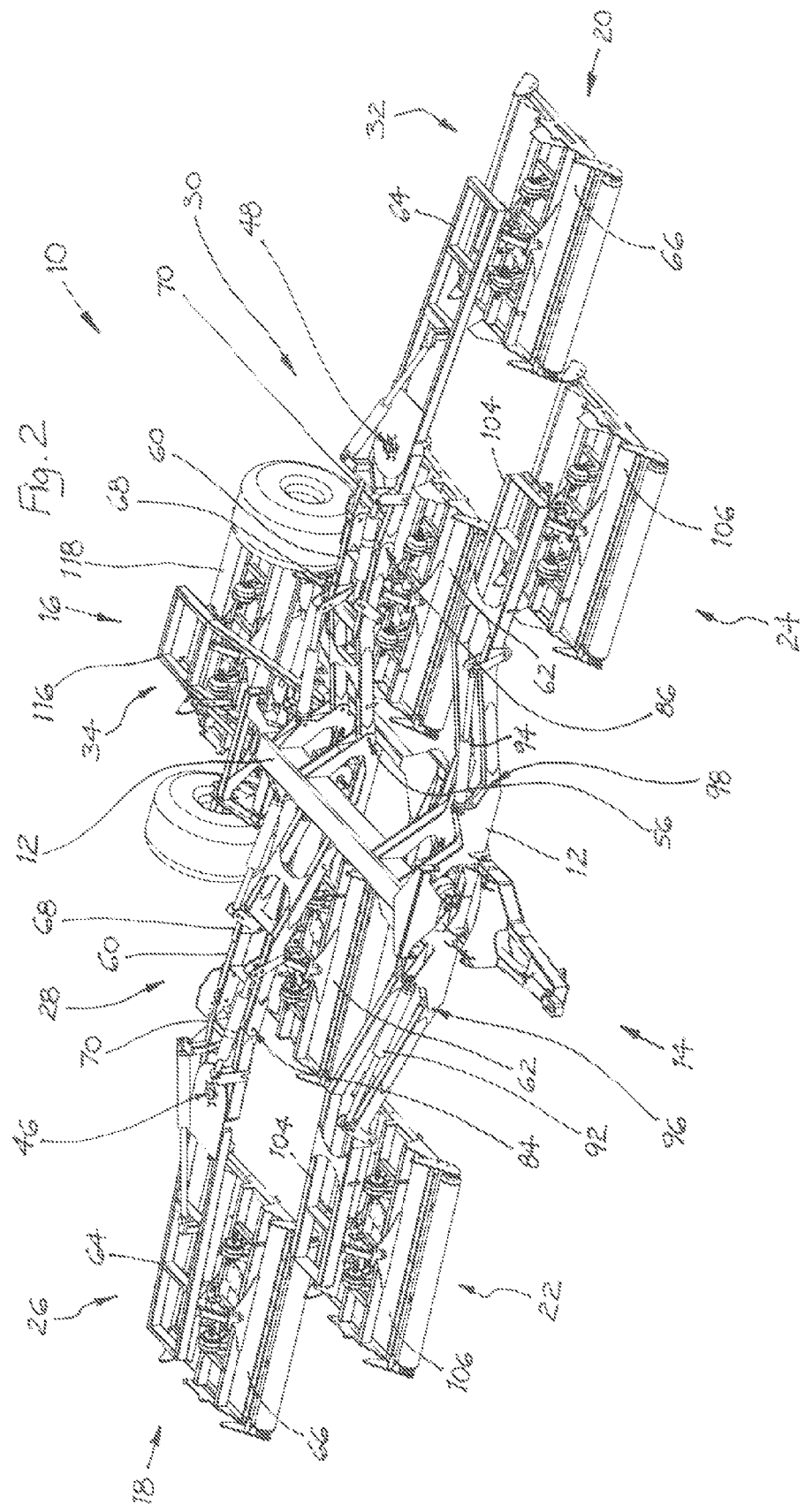
FIG. 2 is a front perspective view of the wide area turf mower of FIG. 1.

The embodiment of the wide area turf mower 10 shown in FIGS. 1 to 18 has, in a broad form, a wheel supported main frame 12 with a front end 14, a rear end 16 and opposite first and second sides 18, 20.

There is a plurality of cutting units 22, 24, 26, 28, 30, 32, 34 movably connected to the main frame 12 and positioned in rows 36, 38, 40 in a staggered order to form a mower cutting configuration (see FIGS. 1 and 2) for cutting a continuous swath of turf between any two outer cutting units 26, 32 located respectively on the opposite sides of the main frame 12.

One row 38 of the cutting units has a first pair of interconnected outer and inner cutting units 26, 28 at the first side 18 of the main frame 12 (see FIG. 3) and has a second pair of interconnected inner and outer cutting units 30, 32 at the second side 20 of the main frame 12. Each of the inner cutting units 28, 30 is pivotally connected to the main frame 12. Each of the outer cutting units 26, 32 is pivotally connected to a respective inner cutting unit 28, 30.

There is a first hydraulic means 42, 44 for rotating each of the outer cutting units 26, 32 relative to its respective inner cutting unit 28, 30 about a respective vertical pivot axis 46, 48. By this rotation, each of the outer cutting units 26, 32 fold in a direction towards the rear end 16 of the main frame 12 (see FIG. 4).

There is a second hydraulic means 50, 52 for rotating each of the inner cutting units 28, 30 relative to the main frame 12 about a respective horizontal pivot axis 54, 56. By this rotation, each of the inner cutting units 28, 30 lift in an upward direction (see FIG. 6).

The mower 10 also has means for controlling the operation of the first hydraulic means 42, 44 and the second hydraulic means 50, 52. Such control means may be a controller which is operably located on a tractor which pulls the mower 10, and may be an electronic controller, and may be programmable.

In the above broad form of the embodiment, the control means operates the first hydraulic means 42, 44 before operating the second hydraulic means 50, 52.

Each inner cutting unit 28, 30 has an inner pivot frame 60 and an inner mower deck 62 connected to the underside of the inner pivot frame 60. An inner end of the inner pivot frame 60 is pivotally connected to the main frame 12 through the respective pivot axis 54, 56, and an outer end of the inner pivot frame 60 is pivotally connected to its respective outer cutting unit 26, 32 through the respective pivot axis 46, 48.

Each outer cutting unit 26, 32 has an outer pivot frame member 64 and an outer mower deck 66 connected to the underside of the outer pivot frame member 64. An inner end of the outer pivot frame member 64 is pivotally connected to the outer end of its respective inner pivot frame 60 through the respective pivot axis 46, 48.

In a narrower form of the embodiment, each inner pivot frame 60 has pivotally interconnected first and second pivot frame members 68, 70. The inner mower deck 62 is connected to the underside of the first pivot frame member 68 of the inner pivot frame 60, and an inner end of the first pivot frame member 68 is pivotally connected to a respective side of the main frame 12 through the respective pivot axis 54, 56.

The first hydraulic means 42, 44 is a pair of hydraulic cylinders, each of which has a cylinder barrel end 72 pivotally connected to the second pivot frame member 70 of the inner pivot frame 60, and a piston rod end 74 pivotally connected to the outer pivot frame member 64.

The second hydraulic means 50, 52 is also a pair of hydraulic cylinders, each of which has a cylinder barrel end 76 pivotally connected to the main frame 12, and a piston rod end 78 pivotally connected to the first pivot frame member 68.

The turf mower 10 also has, in this narrower form of the embodiment, a third hydraulic means 80, 82 for rotating each of the outer cutting units 26, 32 relative to its respective inner cutting unit 28, 30 about a respective horizontal pivot axis 84, 86. By this rotation, each of the outer cutting units 26, 32 lift in an upward direction (see FIG. 5).

The third hydraulic means 80, 82 is also a pair of dual piston hydraulic cylinders, each of which has a first piston rod end 88 pivotally connected to the first pivot frame member 68 of the inner pivot frame 60, and a second piston rod end 90 pivotally connected to the second pivot frame member 70.

In the above narrower form of the embodiment, the control means operates the first hydraulic means 42, 44 before operating the third hydraulic means 80, 82 before operating the second hydraulic means 50, 52.

In a still narrower form of the embodiment, the turf mower 10 also has another row 36 of the cutting units at the front end 14 of the main frame 12. That row 36 has a front cutting unit 22 at the first side 18 of the main frame 12 (see FIG. 7), and has a front cutting unit 24 at the second side 20 of the main frame 12. Each of the front cutting units 22, 24 is pivotally connected to the main frame 12.

There is a front hydraulic means 92, 94 for rotating each of the front cutting units 22, 24 relative to the main frame 12 about a respective front horizontal pivot axis 96, 98. By this rotation, each of the front cutting units 22, 24 lift in an upward direction (see FIG. 8).

The front hydraulic means 92, 94 is a pair of hydraulic cylinders, each of which has a cylinder barrel end 100 pivotally connected to the main frame 12, and a piston rod end 102 pivotally connected to the respective front cutting unit 22, 24.

The control means operates the front hydraulic means 92, 94 after operating the first hydraulic means 42, 44.

Each front cutting unit 22, 24 has a front pivot frame member 104 and a front mower deck 106 connected to the underside of the front pivot frame member 104. An inner end of the front pivot frame member 104 is pivotally connected to a respective side 18, 20 of the main frame 12 through the respective pivot axis 96, 98.

The turf mower 10 also has yet another row 40 of the cutting units at the rear end 16 of the main frame 12 (see FIG. 9). That row 40 has only one rear cutting unit 34 pivotally connected to the main frame 12.

There is a rear hydraulic means 108 for rotating the rear cutting unit 34 relative to the main frame 12 about a rear horizontal pivot axis 110. By this rotation, the rear cutting unit 34 lifts in an upward direction (see FIG. 10).

The rear hydraulic means 108 is a single hydraulic cylinder which has a cylinder barrel end 112 pivotally connected to the main frame 12, and a piston rod end 114 pivotally connected to the rear cutting unit 34.

The control means operates the rear hydraulic means 108 after operating the first hydraulic means 42, 44.

The rear cutting unit 34 has a rear pivot frame member 116 and a rear mower deck 118 connected to the underside of the rear pivot frame member 116. An inner end of the rear pivot frame member 116 is pivotally connected to the rear end 16 of the main frame 12 through the pivot axis 110.

The mower cutting configuration (see FIGS. 1 and 2) formed by the above described articulated arrangement of cutting units 22, 24, 26, 28, 30, 32, 34 positioned in rows in a staggered order is a generally w-shaped configuration.

In the above still narrower form of the embodiment, the control means operates the first hydraulic means 42, 44 before operating the third hydraulic means 80, 82 before operating the rear hydraulic means 108 before operating the front hydraulic means 92, 94 before operating the second hydraulic means 50, 52.

Figure 13:
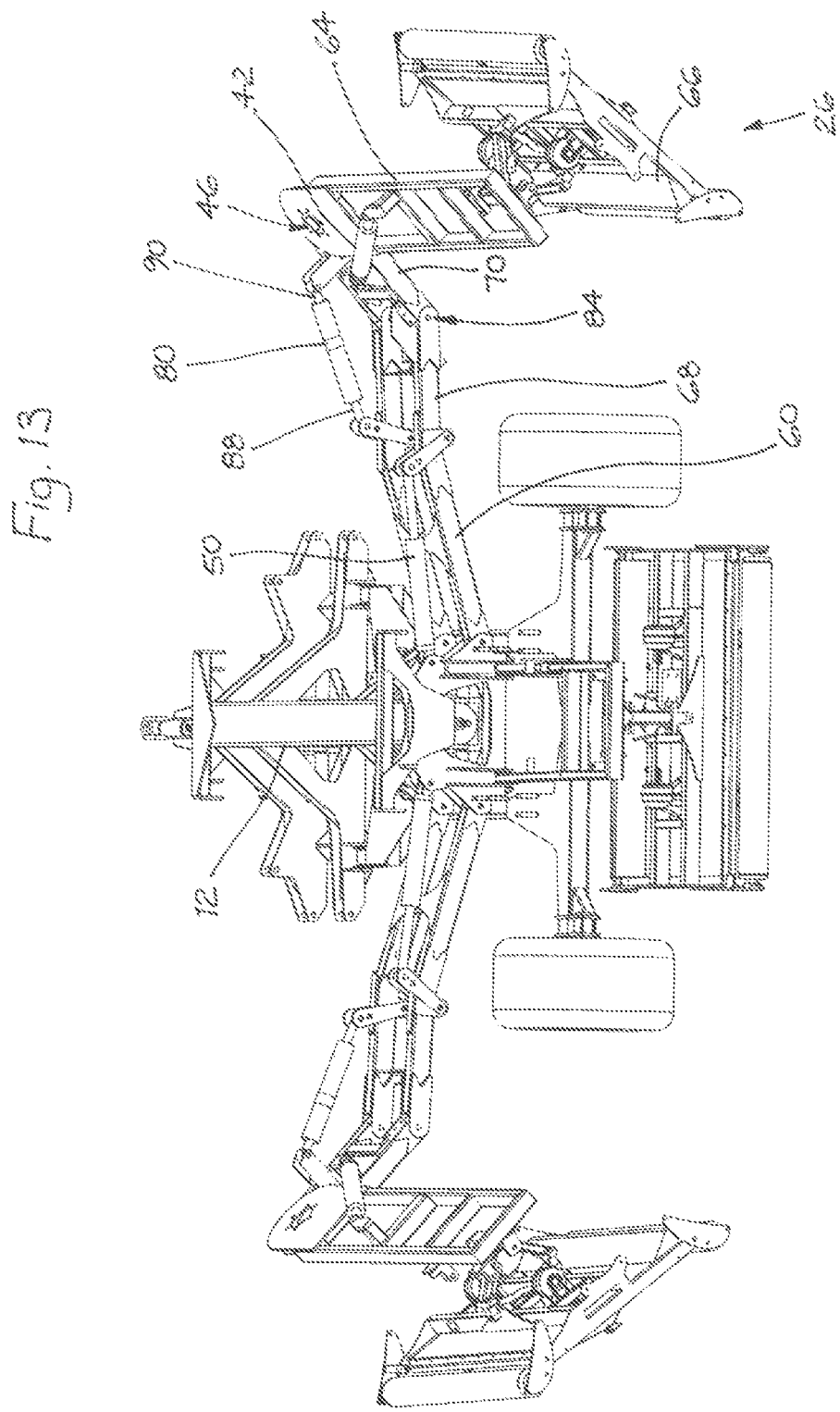
FIG. 13 is a rear perspective view of the wide area turf mower of FIG. 12 at a second stage of the operation when each of the outer cutting units have been lifted in an upward direction, as also shown for one of the outer cutting units in FIG. 5.
Figure 14:
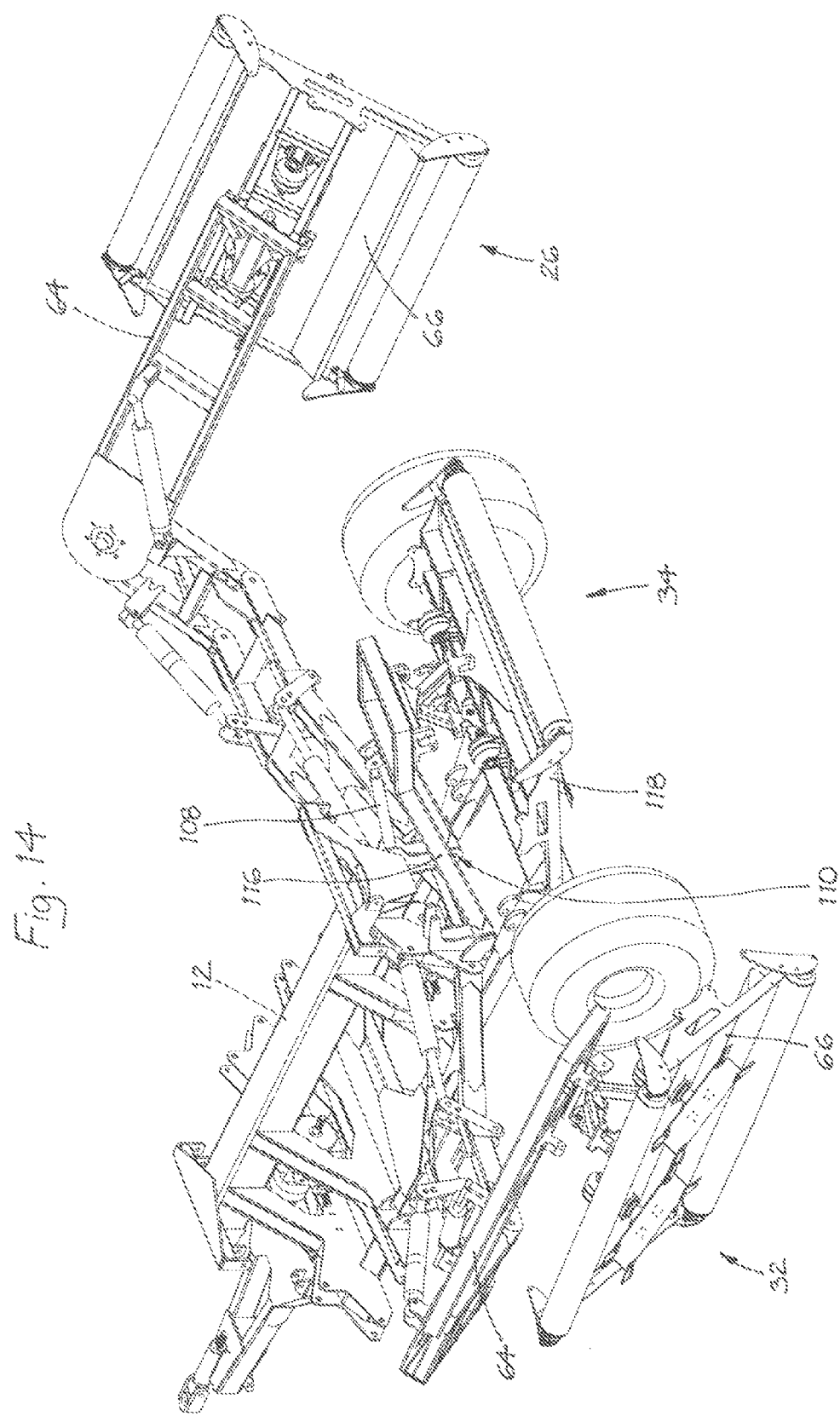
FIG. 14 is a rear perspective view of the wide area turf mower of FIG. 13 at a third stage of the operation when the rear cutting unit has been lifted in an upward direction, as also shown for the rear cutting unit in FIG. 10.

This sequence of controlled operation is shown in its various stages from the start of the folding and lifting operation on all of the cutting units when they are in their cutting positions (as shown in FIG. 11), to a first stage of the operation when each of the outer cutting units 26, 32 have been slightly lifted and then rotated in a direction towards the rear end 16 of the main frame 12 (as shown in FIG. 12), to a second stage of the operation when each of the outer cutting units 26, 32 have been lifted in an upward direction (as shown in FIG. 13), to a third stage of the operation when the rear cutting unit 34 has been lifted in an upward direction (as shown in FIG. 14), to a fourth stage of the operation when each of the front cutting units 22, 24 have been lifted in an upward direction (as shown in FIG. 15), and finally to a fifth stage of the operation when each of the inner cutting units 28, 30 have been lifted in an upward direction (as shown in FIG. 16). After the fifth stage, the mower 10 has assumed a width and height suitable for road use.

As shown in FIGS. 17 and 18, the main frame 12 has a main body 120, a forward tow sub-chassis 122 and a rearward wheel sub-chassis 124. The main body 120 is pivotally connected at a first location at its front end 125 to a rearward end of the forward tow sub-chassis 122 through a pivot axis 126, and is pivotally connected at a second location rearwardly of its front end to a forward end of the rearward wheel sub-chassis 124 through a pivot axis 128.

The mower 10 has forward hydraulic means 130 for lifting the front end 125 of the main body 120 relative to a ground surface and has rearward hydraulic means 132 for lifting a rear end 127 of the main body 120 relative to the ground surface. The control means operates the forward and rearward hydraulic means 130, 132 simultaneously to raise the main frame 12 vertically whilst maintaining the main body 120 generally parallel to the ground surface.

The forward hydraulic means 130 is a pair of hydraulic cylinders, each of which has a cylinder barrel end 134 pivotally connected to the front end 125 of the main body 120, and a piston rod end 136 pivotally connected to the forward tow sub-chassis 122.

The rearward hydraulic means 132 is also a pair of hydraulic cylinders, each of which has a cylinder barrel end 138 pivotally connected to the rearward wheel sub-chassis 124, and a piston rod end 140 pivotally connected to the rear end 127 of the main body 120.

With the above described linkage arrangement of the main body 120, forward tow sub-chassis 122, rearward wheel sub-chassis 124, forward and rearward hydraulic means 130, 132, and control means, each of the cutting units 22, 24, 26, 28, 30, 32, 34 positioned in rows in the staggered order which form the mower cutting configurations described earlier can be lifted simultaneously from a cutting position to a transit position above the ground surface when the main frame 12 is raised vertically (see FIG. 18).

It will be readily apparent to persons skilled in the art that various modifications may be made in details of design and construction of the wide area turf mower described above without departing from the scope and ambit of the present invention.

The invention claimed is:
1. A wide area turf mower comprising:
    (a) a wheel supported main frame having a front end, a rear end and opposite first and second sides,
    (b) a plurality of cutting units movably connected to the main frame and positioned in rows in a staggered order to form a mower cutting configuration for cutting a continuous swath of turf between any two outer cutting units located respectively on the opposite first and second sides of the main frame,
    (c) one row of the cutting units comprising a first pair of interconnected outer and inner cutting units at the first side of the main frame, and a second pair of interconnected inner and outer cutting units at the second side of the main frame, each of the inner cutting units being pivotally connected to the main frame, each of the outer cutting units being pivotally connected to a respective inner cutting unit,
    (d) a first hydraulic cylinder for rotating each of the outer cutting units relative to its respective inner cutting unit about a respective vertical pivot axis, whereby each of the outer cutting units folds in a direction towards the rear end of the main frame,
    (e) a second hydraulic cylinder for rotating each of the inner cutting units relative to the main frame about a respective horizontal pivot axis, whereby each of the inner cutting units lifts in an upward direction, and
    (f) a controller for operating the first hydraulic cylinders and the second hydraulic cylinders.
2. The wide area turf mower of claim 1 wherein the controller operates the first hydraulic cylinders before operating the second hydraulic cylinders.

3. The wide area turf mower of claim 2 wherein each inner cutting unit comprises an inner pivot frame and an inner mower deck connected to the underside of the inner pivot frame, an inner end of the inner pivot frame being pivotally connected to the main frame and an outer end of the inner pivot frame being pivotally connected to its respective outer cutting unit.

4. The wide area turf mower of claim 3 wherein each outer cutting unit comprises an outer pivot frame member and an outer mower deck connected to the underside of the outer pivot frame member, an inner end of the outer pivot frame member being pivotally connected to the outer end of its respective inner pivot frame.

5. The wide area turf mower of claim 4 wherein the inner pivot frame comprises pivotally interconnected first and second pivot frame members, and the inner mower deck is connected to the underside of the first pivot frame member, an inner end of the first pivot frame member being pivotally connected to a respective side of the main frame.

6. The wide area turf mower of claim 5 wherein the first hydraulic cylinder has a first end pivotally connected to the second pivot frame member and a second end pivotally connected to the outer pivot frame member.

7. The wide area turf mower of claim 6 wherein the second hydraulic cylinder has a first end pivotally connected to the main frame and a second end pivotally connected to the first pivot frame member.

8. The wide area turf mower of claim 7 wherein the turf mower further comprises a third hydraulic cylinder for rotating each of the outer cutting units relative to its respective inner cutting unit about a respective horizontal pivot axis, whereby each of the outer cutting units lifts in an upward direction.

9. The wide area turf mower of claim 8 wherein the third hydraulic cylinder has a first end pivotally connected to the first pivot frame member and a second end pivotally connected to the second pivot frame member.

10. The wide area turf mower of claim 9 wherein the controller operates the first hydraulic cylinders before operating the third hydraulic cylinders before operating the second hydraulic cylinders.

11. The wide area turf mower of claim 1 wherein the turf mower further comprises a third hydraulic cylinder for rotating each of the outer cutting units relative to its respective inner cutting unit about a respective horizontal pivot axis, whereby each of the outer cutting units lifts in an upward direction and wherein the turf mower further comprises another row of the cutting units at the front end of the main frame, the another row comprising a front cutting unit at the first side of the main frame and a front cutting unit at the second side of the main frame, each of the front cutting units being pivotally connected to the main frame, and a front hydraulic cylinder for rotating each of the front cutting units relative to the main frame about a respective front horizontal pivot axis, whereby each of the front cutting units lifts in an upward direction, and wherein the controller operates the front hydraulic cylinders after operating the first hydraulic cylinders.

12. The wide area turf mower of claim 11 wherein each front cutting unit comprises a front pivot frame member and a front mower deck connected to the underside of the front pivot frame member, an inner end of the front pivot frame member being pivotally connected to a respective side of the main frame.

13. The wide area turf mower of claim 11 wherein the turf mower further comprises yet another row of the cutting units at the rear end of the main frame, the yet another row comprising a rear cutting unit pivotally connected to the main frame, and a rear hydraulic cylinder for rotating the rear cutting unit relative to the main frame about a rear horizontal pivot axis, whereby the rear cutting unit lifts in an upward direction, and wherein the controller operates the rear hydraulic cylinder after operating the first hydraulic cylinders.

14. The wide area turf mower of claim 13 wherein the rear cutting unit comprises a rear pivot frame member and a rear mower deck connected to the underside of the rear pivot frame member, an inner end of the rear pivot frame member being pivotally connected to the rear end of the main frame.

15. The wide area turf mower of claim 1 wherein the mower cutting configuration is a generally w-shaped configuration.

16. The wide area turf mower of claim 13 wherein the controller operates the first hydraulic cylinders before operating the third hydraulic cylinders before operating the rear hydraulic cylinder before operating the front hydraulic cylinders before operating the second hydraulic cylinders.

17. The wide area turf mower of claim 1 wherein the main frame comprises a main body, a forward tow sub-chassis and a rearward wheel sub-chassis, the main body being pivotally connected at its front end to a rearward end of the forward tow sub-chassis, and being pivotally connected rearwardly of its front end to a forward end of the rearward wheel sub-chassis.

18. The wide area turf mower of claim 17 wherein the turf mower further comprises at least one forward hydraulic cylinder for lifting the front end of the main body relative to a ground surface and at least one rearward hydraulic cylinder for lifting a rear end of the main body relative to the ground surface, and wherein the controller operates the forward and rearward hydraulic cylinders simultaneously to raise the main frame vertically whilst maintaining the main body generally parallel to the ground surface, whereby each of the cutting units can be lifted simultaneously from a cutting position to a transit position above the ground surface when the main frame is raised vertically.

19. The wide area turf mower of claim 18 wherein each forward hydraulic cylinder has a first end pivotally connected to the front end of the main body and a second end pivotally connected to the forward tow sub-chassis.

20. The wide area turf mower of claim 19 wherein each rearward hydraulic cylinder has a first end pivotally connected to the rearward wheel sub-chassis and a second end pivotally connected to the rear end of the main body.

* * * * *